(12) United States Patent
Eita et al.

(10) Patent No.: US 11,560,694 B2
(45) Date of Patent: Jan. 24, 2023

(54) WORK MACHINE AND WORK MACHINE SUPPORT SERVER

(71) Applicant: KOBELCO CONSTRUCTION MACHINERY CO., LTD., Hiroshima (JP)

(72) Inventors: Akihiko Eita, Hiroshima (JP); Shuhei Fujita, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 273 days.

(21) Appl. No.: 16/925,869

(22) Filed: Jul. 10, 2020

(65) Prior Publication Data

US 2021/0017739 A1 Jan. 21, 2021

(30) Foreign Application Priority Data

Jul. 17, 2019 (JP) .............................. JP2019-132104

(51) Int. Cl.
  *B64C 39/02* (2006.01)
  *E02F 9/26* (2006.01)
  *E02F 9/20* (2006.01)
  *G06V 20/56* (2022.01)

(52) U.S. Cl.
  CPC ............ *E02F 9/265* (2013.01); *B64C 39/024* (2013.01); *E02F 9/2025* (2013.01); *G06V 20/56* (2022.01); *B64C 2201/12* (2013.01); *B64C 2201/146* (2013.01)

(58) Field of Classification Search
  None
  See application file for complete search history.

(56) References Cited

U.S. PATENT DOCUMENTS

| | | | | |
|---|---|---|---|---|
| 2020/0325650 A1* | 10/2020 | Tsukamoto | ............... | E02F 9/26 |
| 2020/0332479 A1* | 10/2020 | O'Donnell | ............ | E01C 23/088 |
| 2020/0370282 A1* | 11/2020 | Nishi | ....................... | E02F 9/262 |
| 2021/0002852 A1* | 1/2021 | Nishi | ....................... | E02F 9/262 |
| 2021/0002862 A1* | 1/2021 | Ono | ....................... | E02F 9/2054 |
| 2021/0010236 A1* | 1/2021 | Nishi | ....................... | E02F 9/2033 |
| 2021/0025135 A1* | 1/2021 | Sakuta | .................. | E02F 9/2282 |
| 2021/0198865 A1* | 7/2021 | Wu | ......................... | E02F 3/435 |

FOREIGN PATENT DOCUMENTS

| | | | | |
|---|---|---|---|---|
| EP | 3416015 A1 | * | 12/2018 | ........... B64C 39/024 |
| GB | 2533140 A | * | 6/2016 | ........... A01B 69/008 |
| WO | 2017/131194 A1 | | 8/2017 | |

\* cited by examiner

*Primary Examiner* — Jelani A Smith
*Assistant Examiner* — Davin Seol
(74) *Attorney, Agent, or Firm* — Carrier Shende & Associates, P.C.; Joseph P. Carrier; Jeffrey T. Gedeon

(57) ABSTRACT

Provided is a work machine and the like that can reduce the possibility of contact with an unmanned aircraft flying around. The degree of possibility of contact between a working mechanism (140) and an unmanned aircraft (40) is recognized on the basis of the relative position of the unmanned aircraft (40) with reference to the working mechanism (140). If it is recognized that the contact possibility is high, then the operation mode of at least one of a lower traveling body (110), an upper pivoting body (120), and the working mechanism (140) is controlled so as to reduce the contact possibility.

4 Claims, 8 Drawing Sheets

WORK MACHINE AND WORK MACHINE SUPPORT SERVER

BACKGROUND OF THE INVENTION

1. Field of the Invention

The present invention relates to a work machine such as a building demolition machine.

2. Description of the Related Art

There has been proposed a technology in which a camera attached to an autonomous flying body is used to image a space that cannot be imaged by a camera attached to an upper pivoting body of an excavator (refer to, for example, WO2017/131194).

However, if an excavator is operated without regard to the position of a flying body, then the possibility of contact between the excavator and the flying body inconveniently increases.

SUMMARY OF THE INVENTION

An object of the present invention is, therefore, to provide a work machine that can reduce the possibility of contact with an unmanned aircraft flying around.

The present invention relates to a work machine including: a lower traveling body; an upper pivoting body that can pivot with respect to the lower traveling body; a working mechanism that extends from the upper pivoting body; and a control unit that controls an operation mode of each of the lower traveling body, the upper pivoting body, and the working mechanism. Further, the present invention relates to a work machine support server that has a function to communicate with each of the work machine and an unmanned aircraft.

In the work machine according to the present invention, the control unit includes: a contact possibility recognition element that recognizes a degree of possibility of contact between the working mechanism and an unmanned aircraft according to a relative position of the unmanned aircraft with reference to the working mechanism; and a contact avoidance operation control element which, if the contact possibility recognition element recognizes that a contact possibility is high, controls the operation mode of at least one of the lower traveling body, the upper pivoting body, and the working mechanism such that the contact possibility reduces.

A work machine support server in accordance with the present invention includes: a contact possibility recognition element which recognizes a degree of possibility of contact between the working mechanism and an unmanned aircraft on a basis of a relative position of the unmanned aircraft with reference to the working mechanism according to communication with at least one of the work machine and the unmanned aircraft; and a contact avoidance operation control element that transmits a specified signal to the work machine such that, if the contact possibility recognition element recognizes that the contact possibility is high, the operation mode of at least one of the lower traveling body, the upper pivoting body, and the working mechanism is controlled by the control unit so as to reduce the contact possibility.

DESCRIPTION OF THE PREFERRED EMBODIMENTS (Configuration)

Figure 1:
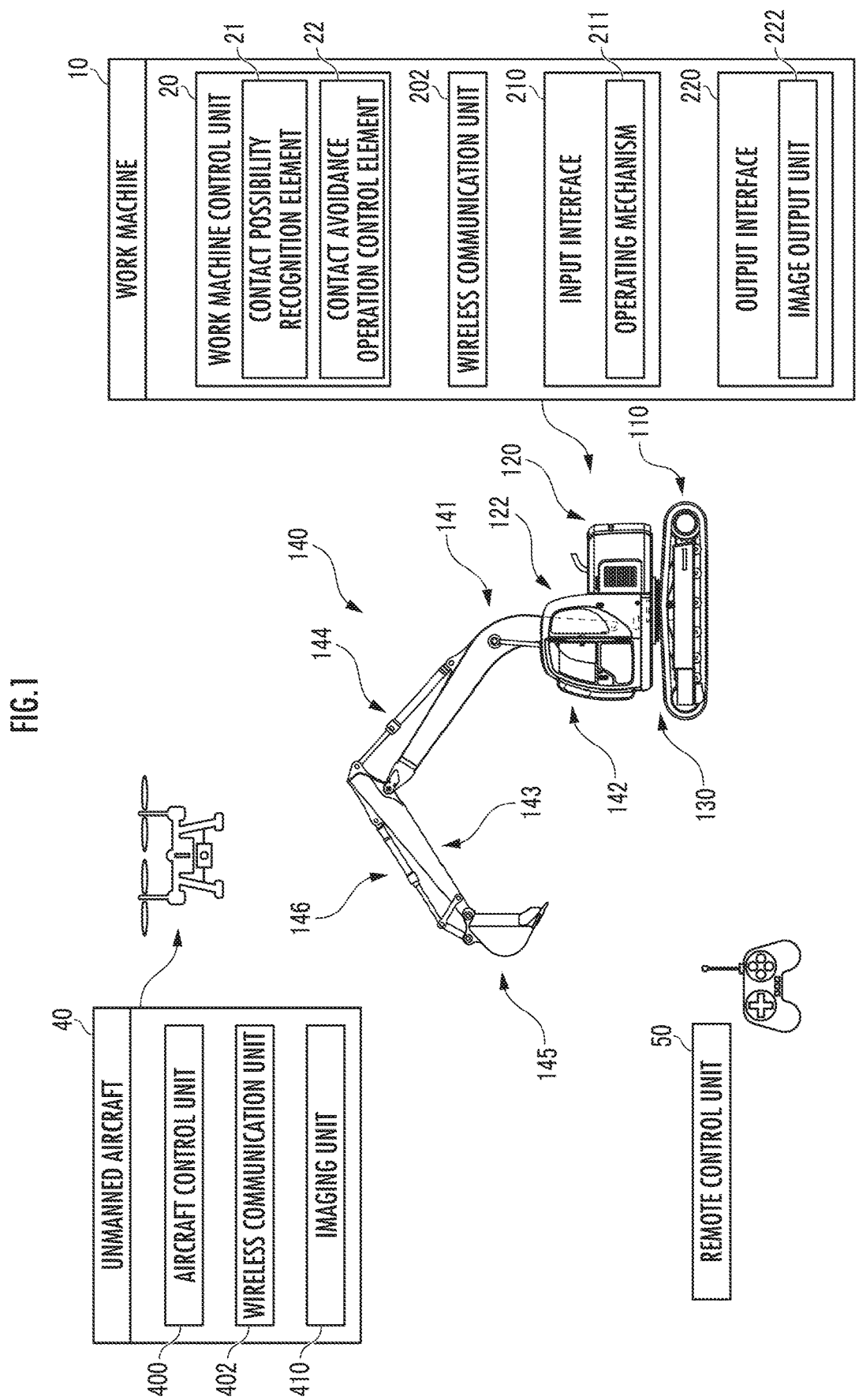
FIG. 1 is an explanatory diagram illustrating the configurations of a work machine and an unmanned aircraft as one embodiment of the present invention.

A work machine 10 as one embodiment of the present invention illustrated in FIG. 1 performs predetermined work in collaboration with an unmanned aircraft 40. The work machine 10 is, for example, a crawler excavator (construction machine), and includes a crawler type lower traveling body 110 and an upper pivoting body 120 pivotably mounted on the lower traveling body 110 through the intermediary of a pivoting mechanism 130. A cab (driver compartment) 122 is provided on the left front side of the upper pivoting body 120. A work attachment serving as a working mechanism 140 is provided at the front center of the upper pivoting body 120.

The working mechanism 140 includes a boom 141 liftably attached to the upper pivoting body 120, an arm 143 rotatably connected to the distal end of the boom 141, and a bucket 145 rotatably connected to the distal end of the arm 143. Attached to the working mechanism 140 are a boom cylinder 142, an arm cylinder 144, and a bucket cylinder 146 composed of expandable hydraulic cylinders. In place of the bucket 145, other attachment such as a nibbler may be attached to the distal end of the arm 143.

The boom cylinder 142 is interposed between the boom 141 and the upper pivoting body 120 so that the boom cylinder 142 expands or contracts by receiving the supply of hydraulic oil thereby to cause the boom 141 to pivot in an upward or downward direction. The arm cylinder 144 is interposed between the arm 143 and the boom 141 such that the arm cylinder 144 expands or contracts by receiving the supply of hydraulic oil thereby to cause the arm 143 to pivot around a horizontal axis with respect to the boom 141. The bucket cylinder 146 is interposed between the bucket 145 and the arm 143 such that the bucket cylinder 146 expands or contracts by receiving the supply of hydraulic oil thereby to cause the bucket 145 to pivot around the horizontal axis with respect to the arm 143.

The work machine 10 includes a work machine control unit 20, a wireless communication unit 202, an input interface 210, and an output interface 220. The work machine control unit 20 is composed of an arithmetic processing unit (a single-core processor, a multi-core processor, or a processor core that constitutes the single-core processor or the multi-core processor), which reads necessary data and software from a memory or other storage device, and executes arithmetic processing on the data according to the software.

The work machine control unit 20 includes a contact possibility recognition element 21 and a contact avoidance operation control element 22. The contact possibility recognition element 21 recognizes the degree of possibility of contact (an interference possibility) between the working mechanism 140 and the unmanned aircraft 40 on the basis of the relative position of the unmanned aircraft 40 with reference to the working mechanism 140. The term "recognition" refers to a concept that encompasses determining, designating or estimating the degree of possibility of contact on the basis of the relative position of the unmanned aircraft 40 with reference to the working mechanism 140, and receiving a result of the determination or reading from a storage unit. If the contact possibility recognition element 21 recognizes that the contact possibility is high, then the contact avoidance operation control element 22 controls the operation mode of at least one of the lower traveling body 110, the upper pivoting body 120, and the working mechanism 140 such that the contact possibility is reduced.

An operating mechanism 211 constituting the input interface 210 includes a travel operating unit, a pivoting operating unit, a boom operating unit, an arm operating unit, and a bucket operating unit. Each of the operating units has an operating lever subjected to rotational operations. The operating lever (travel lever) of the travel operating unit is operated to move the lower traveling body 110. The travel lever may also serve as a travel pedal. For example, a travel pedal fixed to the base or lower end of the travel lever may be provided. The operating lever of the pivoting operating unit (pivoting lever) is operated to move a hydraulic pivoting motor constituting the pivoting mechanism 130. The operating lever of the boom operating unit (boom lever) is operated to move a boom cylinder 142. The operating lever of the arm operating unit (arm lever) is operated to move an arm cylinder 144. An operating lever (bucket lever) of the bucket operating unit is operated to move a bucket cylinder 146.

Figure 2:
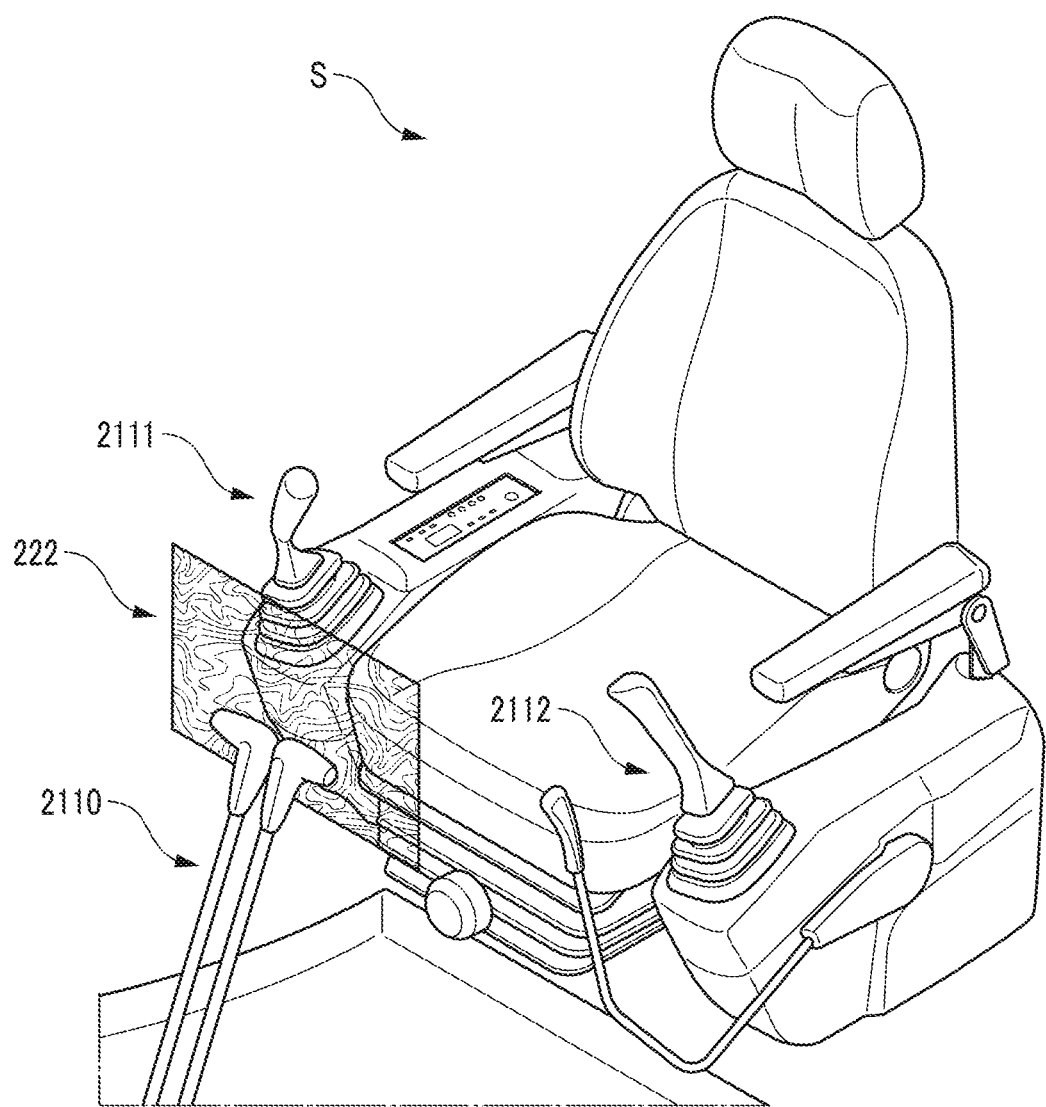
FIG. 2 is an explanatory diagram illustrating the configuration of an operating mechanism of the work machine.

The operating levers constituting the operating mechanism 211 are placed, for example, around a seat S for an operator to sit on, as illustrated in FIG. 2. The seat S is in the form of a high-back chair with armrests, but may be in any form that allows an operator to sit thereon, such as a low-back chair without a headrest, or a chair without a backrest.

A pair of left and right travel levers 2110 corresponding to the left and right crawlers are placed side by side in front of the seat S. A single operating lever may serve as a plurality of operating levers. For example, a right operating lever 2111 provided in front of a right frame of the seat S illustrated in FIG. 3 may function as a boom lever when operated in a longitudinal direction, and may function as a bucket lever when operated in a lateral direction. Similarly, a left operating lever 2112 provided in front of a left frame of the seat S illustrated in FIG. 3 may function as an arm lever when operated in the longitudinal direction, and may function as a pivoting lever when operated in the lateral direction. The lever pattern may be arbitrarily changed according to an operating instruction of the operator.

An image output unit 222 constituting the output interface 220 is placed, for example, in front of the seat S, as illustrated in FIG. 2. The image output unit 222 may be further provided with a speaker (audio output device).

The unmanned aircraft 40 includes an aircraft control unit 400, a wireless communication unit 402, and an imaging unit 410. The unmanned aircraft 40 may be a constituent element of the work machine 10. In this case, the work machine 10 may be provided with a basement where the unmanned aircraft 40 departs and lands. The unmanned aircraft 40 is a rotorcraft, and mainly includes a plurality (e.g., four, six, or eight) of blades, an electric motor (actuator) for rotating the plurality of blades, a battery for supplying power to the motor, and the like. The unmanned aircraft 40 can be operated through a remote control unit 50. For example, the remote control unit of the unmanned aircraft 40 may be constituted by the input interface 210.

Figure 3:
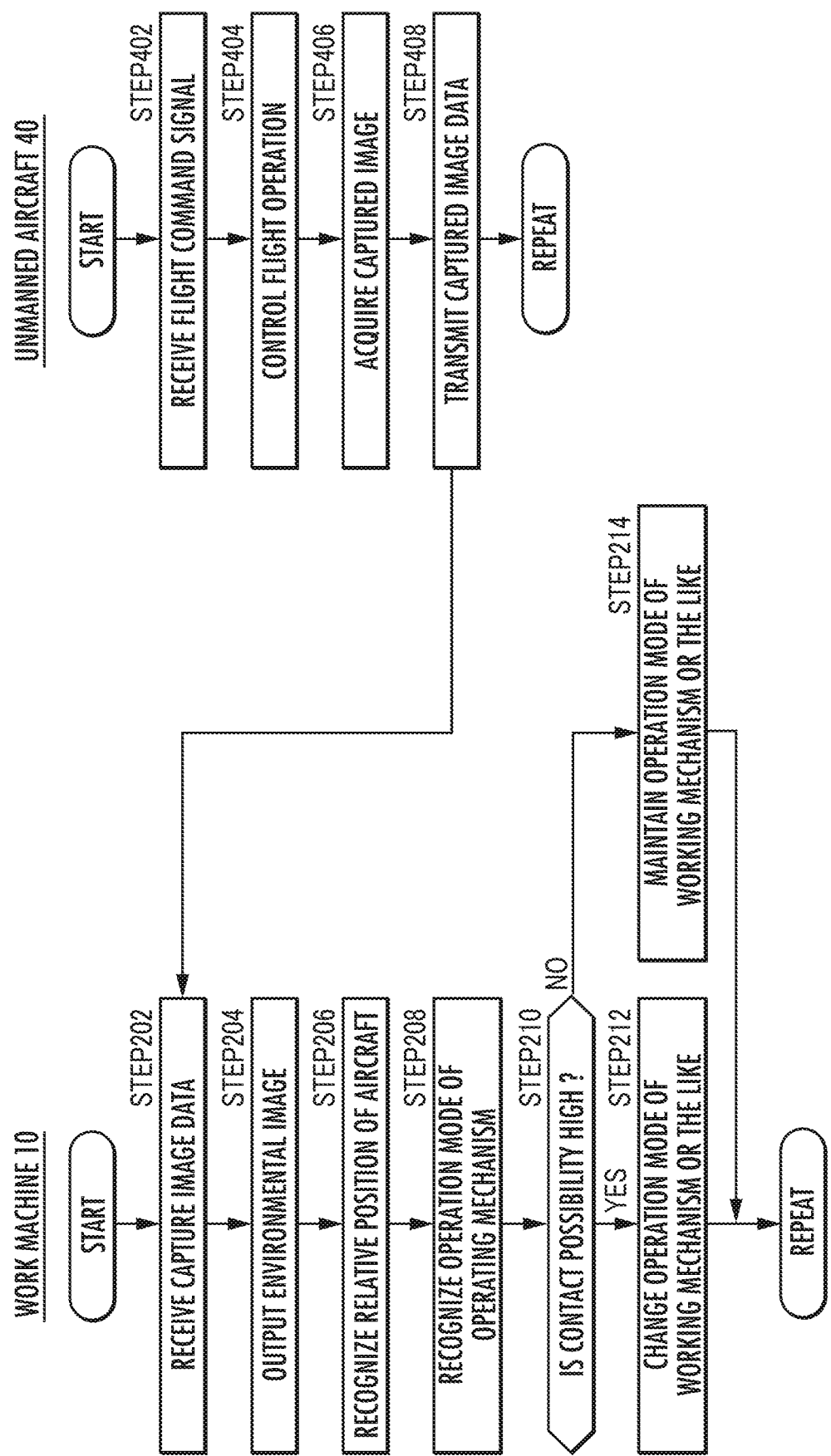
FIG. 3 is an explanatory diagram illustrating the functions of the work machine as one embodiment of the present invention.

(Function) In the unmanned aircraft 40, a flight command signal transmitted from the remote control unit 50 is received by the aircraft control unit 400 through the wireless communication unit 402 (STEP402 of FIG. 3). The aircraft control unit 400 controls the actuator (the electric motor) and the rotational movement of each of the plurality of blades powered by the actuator (STEP404 of FIG. 3). This enables the unmanned aircraft 40 to fly, ascend or descend on the spot, or remain in the air by an airflow generated by the rotation of the plurality of blades.

Figure 4:
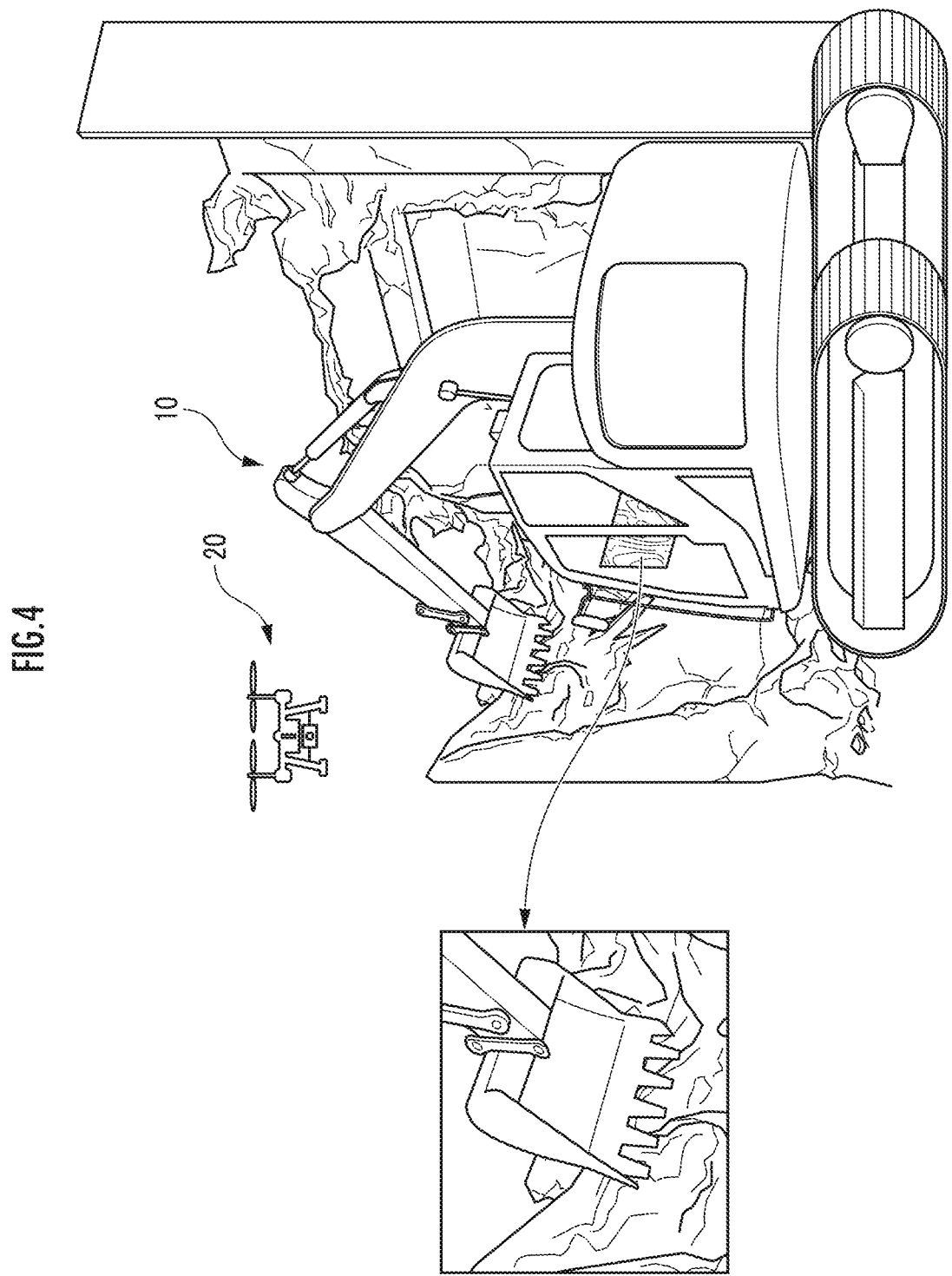
FIG. 4 is an explanatory diagram illustrating an image output mode in an image output unit.

In the unmanned aircraft 40, the imaging unit 410 acquires a captured image that includes a specific portion of the working mechanism 140, such as the bucket 145, which is the distal end portion of an attachment (STEP406 of FIG. 3). Thus, for example, as illustrated on the left side in FIG. 4, when the work machine 10 is destroying a building, the bucket 145 is imaged from obliquely left front and from above by the imaging unit 410 mounted on the unmanned aircraft 40. The captured image data representing the captured image is transmitted to the work machine 10 by the aircraft control unit 400 through the wireless communication unit 402 (STEP408 of FIG. 3).

In the work machine 10, the captured image data is received by the work machine control unit 20 through the wireless communication unit 202 (STEP202 of FIG. 3). By the work machine control unit 20, an environmental image based on the captured image data (all or a part of the captured image itself or a simulated environmental image generated on the basis thereof) is displayed on the image output unit 222 (STEP204 of FIG. 3). Thus, for example, as illustrated on the right side in FIG. 4, an environmental image including the bucket 145 when the work machine 10 is destroying the building is displayed on the image output unit 222.

The work machine control unit 20 recognizes the relative position of the unmanned aircraft 40 with reference to the working mechanism 140 (STEP206 of FIG. 3). For example, by referring to an image database on the basis of the shape and the size of each of the bucket 145, the arm 143, and the boom 141 in the captured image, the relative position of the unmanned aircraft 40 with reference to a specified location of each of the bucket 145, the arm 143, and the boom 141 is estimated. A marker of a predetermined shape may be attached to a specified location of each of the bucket 145, the arm 143, and the boom 141, and the relative position of the unmanned aircraft 40 may be estimated with reference to the specified location of each of the bucket 145, the arm 143, and the boom 141 by referring to the image database on the basis of the shapes and the sizes of the markers in the captured image. A ranging image sensor or a TOF sensor may be mounted on the unmanned aircraft 40, and the relative position of the unmanned aircraft 40 with reference to the specified location of each of the bucket 145, the arm 143, and the boom 141 may be estimated on the basis of the ranging data acquired through the sensor.

The position (and attitude) of the unmanned aircraft 40 in a world coordinate system (or a real space coordinate system) may be measured, and the result of the measurement may be transmitted from the unmanned aircraft 40 to the work machine 10 so as to measure the real space position of the unmanned aircraft 40 or the relative position of the unmanned aircraft 40 with reference to the specified location of each of the bucket 145, the arm 143, and the boom 141 by the contact possibility recognition element 21.

The latitude (Y coordinate value) and the longitude (X coordinate value) in the world coordinate system (or the real space coordinate system) are measured by a positioning device such as a GPS mounted on the unmanned aircraft 40. The absolute altitude or the air pressure altitude (Z coordinate value) in the world coordinate system is measured by the TOF sensor or an atmospheric pressure sensor.

The position and the attitude of each of the boom 141, the arm 143, and the bucket 145 in a work machine coordinate system (a coordinate system in which the position and the attitude are fixed with respect to the upper pivoting body 120) are measured on the basis of the angle of each of the coupling mechanism (or a joint mechanism) for the upper pivoting body 120 and the boom 141, the coupling mechanism for the boom 141 and the arm 143, and the coupling mechanism for the arm 143 and the bucket 145, and the size of each of the boom 141, the arm 143, and the bucket 145. The latitudes (Y coordinate values) and the longitudes (X coordinate values) of the upper pivoting body 120 and the work machine coordinate system in the world coordinate system are measured by a positioning system, such as a GPS, mounted on the upper pivoting body 120. The Z coordinate value of the work machine coordinate system in the world coordinate system is determined in advance. The attitude of the work machine coordinate system in the world coordinate system is measured by an azimuth sensor and a tilt angle sensor mounted on the upper pivoting body 120. Thus, the position and the attitude of each of the boom 141, the arm 143, and the bucket 145 in the world coordinate system are measured.

The work machine control unit 20 recognizes the control mode of each of the operating levers, which constitute the operating mechanism 211, selected by the operator (STEP208 of FIG. 3).

In the work machine control unit 20, the contact possibility recognition element 21 determines whether the possibility of contact between the working mechanism 140 and the unmanned aircraft 40 is high on the basis of the relative position of the unmanned aircraft 40 with reference to one or a plurality of specified locations of the working mechanism 140 and the control mode of each of the operating levers constituting the operating mechanism 211 selected by the operator (STEP210 of FIG. 3). For example, if the interval between a specified location of the working mechanism 140 and the unmanned aircraft 40 is equal to or less than a predetermined value, and the operation mode of the working mechanism 140 or the like as a working mechanism according to the control mode of the operating mechanism 211 is an operation mode that brings the specified location closer to the unmanned aircraft 40, then it is determined that there is a high probability of contact between the working mechanism 140 and the unmanned aircraft 40.

Figure 5:
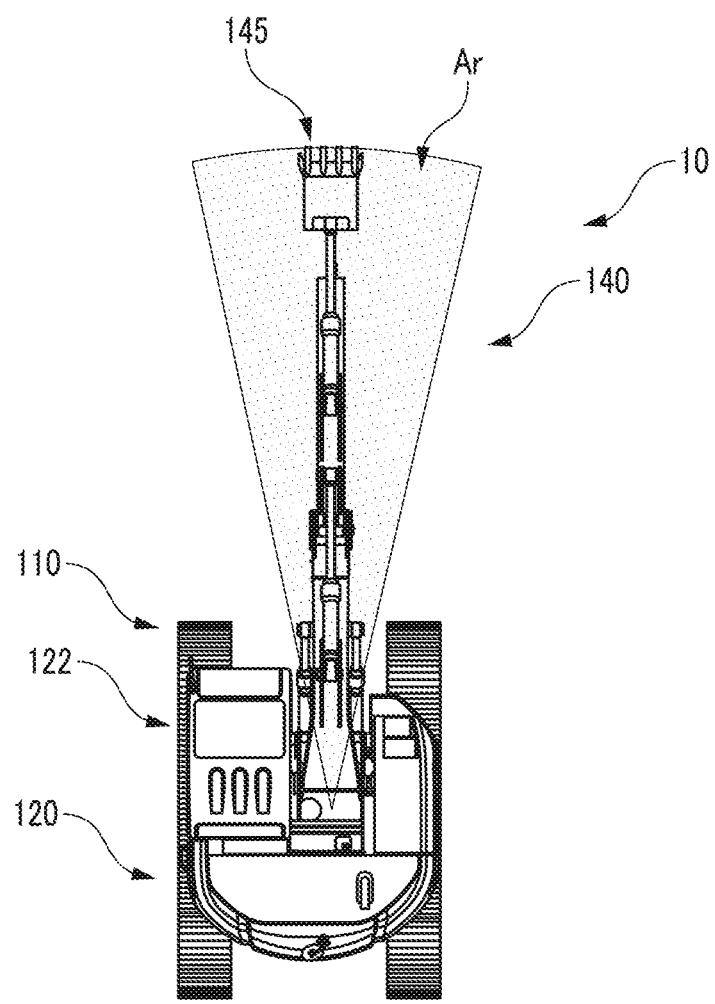
FIG. 5 is an explanatory diagram illustrating a method for recognizing the degree of possibility of contact between the work machine and the unmanned aircraft.

The degree of possibility of contact between the working mechanism 140 and the unmanned aircraft 40 may alternatively be recognized according to whether the real space position of the unmanned aircraft 40 is included in a reference space determined on the basis of the overall attitude of the working mechanism 140. The term "reference space" is defined such that the reference space includes a space that the working mechanism 140 or a part thereof occupies or passes through in a specified period of time when the upper pivoting body 120 pivots with respect to the lower traveling body 110. For example, as illustrated in FIG. 5, a reference space Ar is defined such that the reference space Ar includes a space that the working mechanism 140 or a part thereof occupies or passes through when the upper pivoting body 120 pivots clockwise or counterclockwise with respect to the lower traveling body 110. The overall attitude of the working mechanism 140 and the mode of extension thereof in a vertical direction and the longitudinal direction can be estimated on the basis of the measurement result of the angle of each of the coupling mechanism (or the joint mechanism) for the upper pivoting body 120 and the boom 141, the coupling mechanism for the boom 141 and the arm 143, and the coupling mechanism for the arm 143 and the bucket 145.

The central angle of the reference space Ar having a substantially fan-shaped cross section corresponds to a pivotable angle of the upper pivoting body 120 with respect to the lower traveling body 110 in a specified period of time. In a situation in which the upper pivoting body 120 is pivoting counterclockwise with respect to the lower traveling body 110, the reference space Ar may be defined such that the angle in the counterclockwise direction is larger than the angle in the clockwise direction, i.e., such that the reference space Ar is asymmetrical with reference to the working mechanism 140.

If it is recognized that the possibility of contact between the working mechanism 140 and the unmanned aircraft 40 is high (YES in STEP210 of FIG. 3), then the operation mode of the working mechanism 140 or the like based on the control mode is changed by the contact avoidance operation control element 22 (STEP 212 of FIG. 3). Thus, for example, the amount of hydraulic oil supplied to a hydraulic actuator for driving the working mechanism 140 is reduced or the supply of the hydraulic oil is stopped, thereby causing the operating speed of the working mechanism 140 to be reduced or the operation to be stopped.

Meanwhile, if it is recognized that the possibility of contact between the working mechanism 140 and the unmanned aircraft 40 is low (NO in STEP210 of FIG. 3), then the operation mode of the working mechanism 140 or the like based on the control mode is maintained by the contact avoidance operation control element 22 (STEP214 of FIG. 3).

For example, a case will be discussed, where the interval between a specified location of the working mechanism 140 and the unmanned aircraft 40 is equal to or less than a predetermined value during each of the periods of time $t=t_{10} \sim t_{13}$ and $t=t_{15} \sim t_{16}$ as illustrated in the upper stage of FIG. 6, and the operation mode of the working mechanism 140 or the like is an operation mode in which the interval between the specified location and the unmanned aircraft 40 decreases in each of the periods of time $t=t_{11} \sim t_{12}$ ($t_{10}<t_{11}$, $t_{12}<t_{13}$) and $t=t_{14}<t_{17}$ ($t_{14}<t_{15}$, $t_{16}<t_{17}$) as illustrated in the middle stage of FIG. 6. In this case, as illustrated in the lower stage of FIG. 6, the operating speed of the working mechanism 140 or the like is reduced or the operation thereof is stopped in each of the periods of time $t=t_{11} \sim t_{12}$ and $t=t_{15} \sim t_{16}$ during which the interval between the specified location of the working mechanism 140 and the unmanned aircraft 40 is equal to or less than a predetermined value, and the operation mode of the working mechanism 140 or the like is an operation mode for approaching to the unmanned aircraft 40.

For example, a case will be discussed, where the interval between a specified location of the working mechanism 140 and the unmanned aircraft 40 is equal to or less than a predetermined value during each of the periods of time $t=t_{21} \sim t_{22}$ and $t=t_{23} \sim t_{24}$ and $t=t_{26} \sim t_{29}$ as illustrated in the upper stage of FIG. 7, and the operation mode of the working mechanism 140 or the like is an operation mode in which the interval between the specified location and the unmanned aircraft 40 decreases in each of the periods of time $t=t_{20} \sim t_{25}$ ($t_{20} < t_{21}$, $t_{24} < t_{25}$) and $t=t_{27} \sim t_{28}$ ($t_{26} < t_{27}$, $t_{28} < t_{29}$) as illustrated in the middle stage of FIG. 7. In this case, as illustrated in the lower stage of FIG. 7, the operating speed of the working mechanism 140 or the like is reduced or the operation thereof is stopped in each of the periods of time $t=t_{21} \sim t_{22}$ and $t=t_{27} \sim t_{28}$ during which the interval between the specified location of the working mechanism 140 and the unmanned aircraft 40 is equal to or less than a predetermined value, and the operation mode of the working mechanism 140 or the like is an operation mode for approaching to the unmanned aircraft 40.

(Effect)

Figure 6:
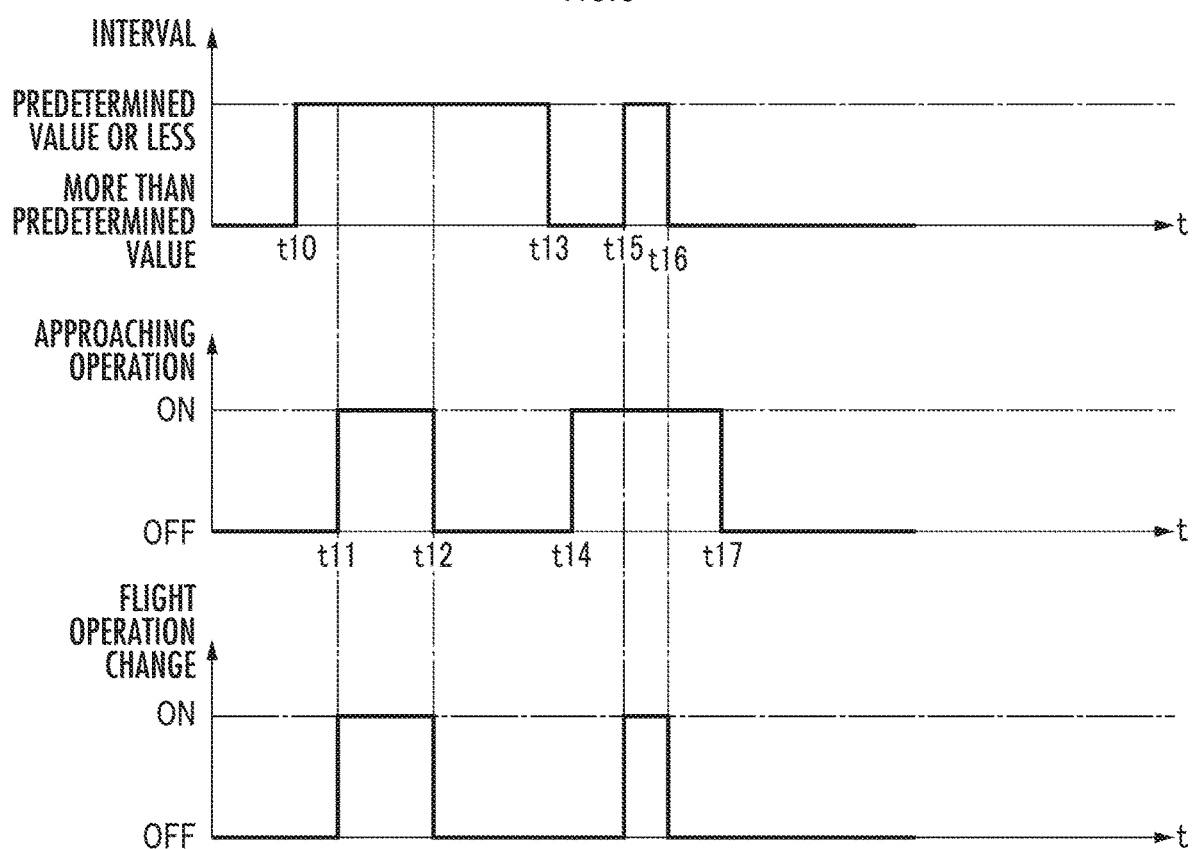
FIG. 6 is an explanatory diagram illustrating a first control mode of the working mechanism or the like according to the degree of possibility of contact with the unmanned aircraft.
Figure 7:
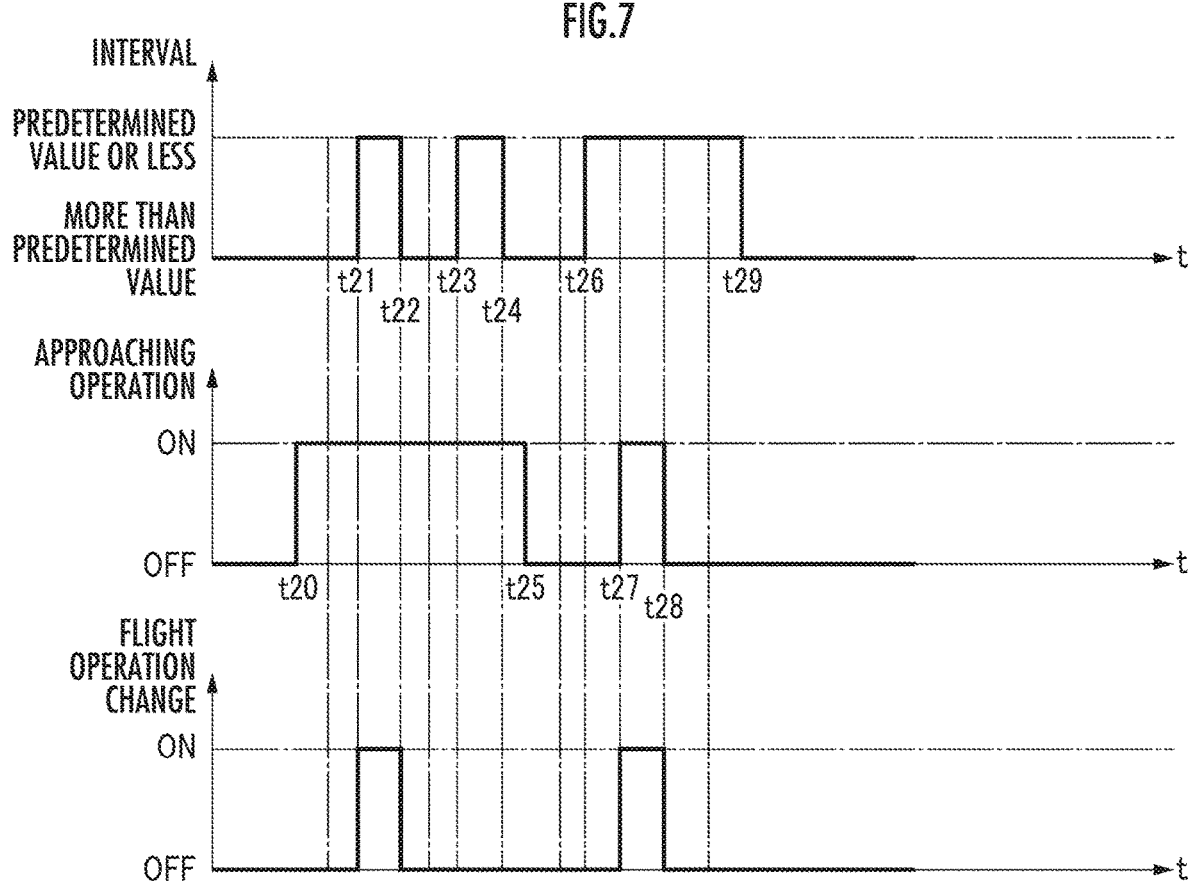
FIG. 7 is an explanatory diagram illustrating a second control mode of the working mechanism or the like according to the degree of possibility of contact with the unmanned aircraft.

If it is recognized that the possibility of contact between the working mechanism 140 constituting the work machine 10 having the configuration and the unmanned aircraft 40 is high, then the operation of at least one of the lower traveling body 110, the upper pivoting body 120, and the working mechanism 140 is controlled, thereby reducing the possibility of contact (refer to FIG. 6 and FIG. 7).

The contact possibility recognition element 21 recognizes a state of change in the possibility of contact between the working mechanism 140 and the unmanned aircraft 40 based on a state of change in the relative position of the unmanned aircraft 40 with reference to the working mechanism 140 according to the operation mode of at least one of the lower traveling body 110, the upper pivoting body 120, and the working mechanism 140, and the contact avoidance operation control element 22 changes a current operation mode of at least one of the lower traveling body 110, the upper pivoting body 120, and the working mechanism 140 if the contact possibility recognition element 21 recognizes that the contact possibility will be high.

According to the work machine having the configuration, if it is recognized that maintaining the operation mode of the working mechanism 140 or the like will lead to a higher possibility of contact between the working mechanism 140 and the unmanned aircraft 40 in the future, then the operation mode of the working mechanism 140 or the like is changed thereby to reduce the possibility of contact.

The contact possibility recognition element 21 recognizes the spread state of a reference space encompassing a space that the working mechanism 140 occupies or passes through in a specified period of time on the basis of the operation mode of at least one of the lower traveling body 110, the upper pivoting body 120, and the working mechanism 140 in the specified period of time, and recognizes that the contact possibility is high if the real space position of the unmanned aircraft 40 is included in the reference space.

According to the work machine having the configuration, when the working mechanism 140 or the like is operated in a specified period of time, the possibility of contact between the working mechanism 140 and the unmanned aircraft 40 in the specified period of time is predicted in advance, and the operation of the working mechanism 140 or the like is controlled, thus further reducing the contact possibility.

Another Embodiment of the Present Invention

Figure 8:
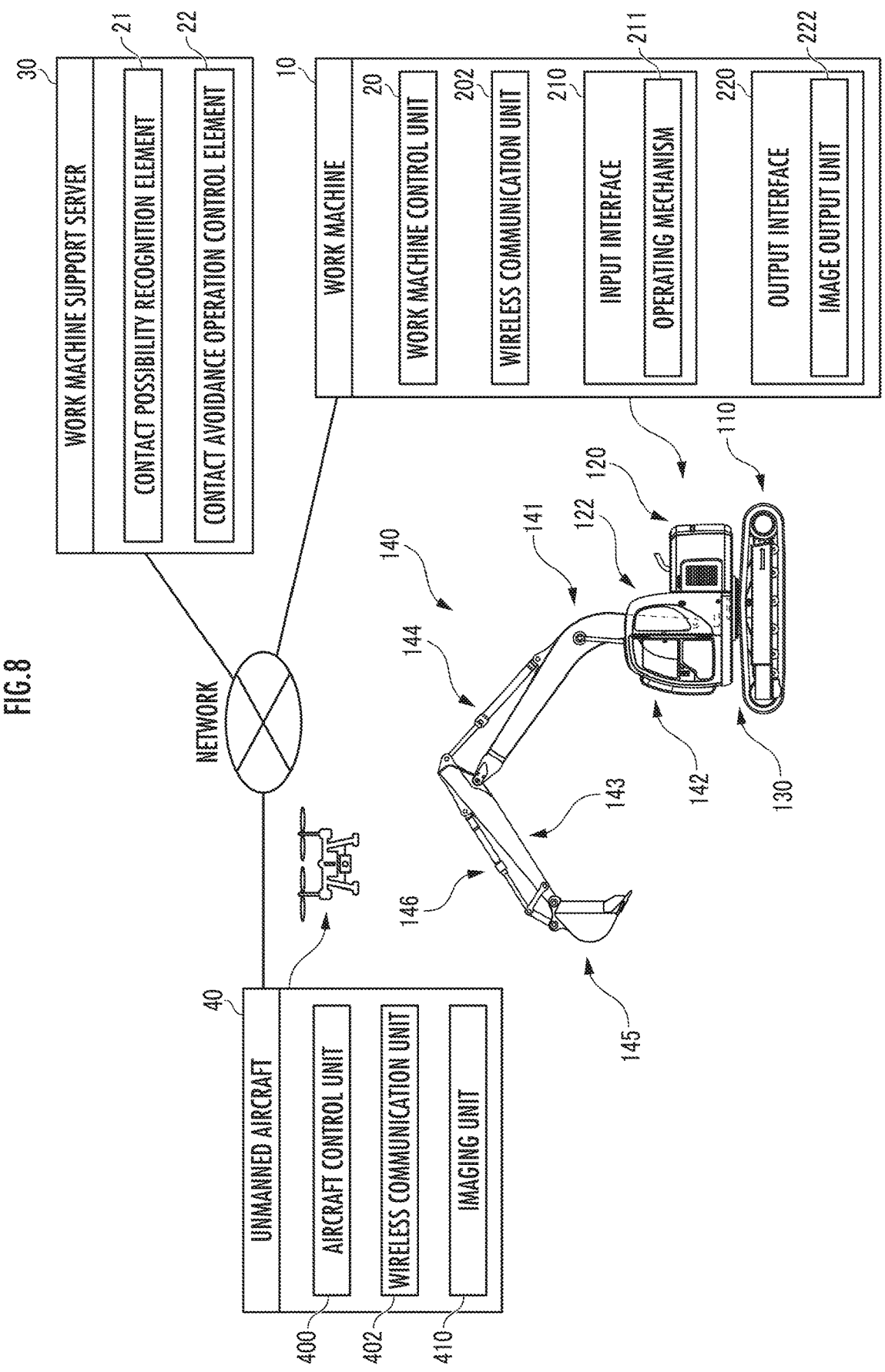
FIG. 8 is an explanatory diagram illustrating the configuration of a work machine support server as one embodiment of the present invention.

A work machine support server 30 as one embodiment of the present invention illustrated in FIG. 8 has a function for communicating with each of a work machine 10 and an unmanned aircraft 40. The work machine support server 30 may be mounted on the unmanned aircraft 40 and may have the function for communicating with the work machine 10. The work machine support server 30 includes a contact possibility recognition element 21 and a contact avoidance operation control element 22. In this case, a work machine control unit 20 may not have such functions as the contact possibility recognition element 21 and the contact avoidance operation control element 22.

According to the work machine support server 30 having the configuration, if the contact possibility recognition element 21 recognizes that the possibility of contact between a working mechanism 140 and the unmanned aircraft 40 is high, then the contact avoidance operation control element 22 transmits a designated signal to the work machine 10. In response to the designated signal, a work machine control unit 20 controls the operation mode of the working mechanism 140 or the like so as to reduce the contact possibility. Thus, if the possibility of contact between the working mechanism 140 of the work machine 10 and the unmanned aircraft 40 is recognized as being high, then the operation of the working mechanism 140 or the like is controlled thereby to reduce the contact possibility (refer to FIG. 3, FIG. 6, and FIG. 7).

DESCRIPTION OF REFERENCE NUMERALS

10 . . . work machine; 20 . . . work machine control unit; 21 . . . contact possibility recognition element; 22 . . . contact avoidance operation control element; 30 . . . work machine support server; 40 . . . unmanned aircraft; 202 . . . wireless communication unit; 210 . . . input interface; 211 . . . operating mechanism; 220 . . . output interface; 222 . . . image output unit; 140 . . . working mechanism (work attachment); 400 . . . aircraft control unit; 402 . . . wireless communication unit; and 410 . . . imaging unit.

What is claimed is:

1. A work machine comprising: a lower traveling body; an upper pivoting body that can pivot with respect to the lower traveling body; a working mechanism that extends from the upper pivoting body; and a control unit that controls an operation mode of each of the lower traveling body, the upper pivoting body, and the working mechanism, wherein the control unit comprises:
 a contact possibility recognition element that recognizes a degree of possibility of contact between the working mechanism and an unmanned aircraft according to a relative position of the unmanned aircraft with reference to the working mechanism and a control mode of at least one operating levers constituting an operating mechanism selected by an operator of the work machine; and
 a contact avoidance operation control element which, in a case where the contact possibility recognition element recognizes that a contact possibility is high, controls the operation mode of at least one of the lower traveling body, the upper pivoting body, and the working mechanism such that the contact possibility reduces,
 wherein the contact possibility recognition element recognizes that the degree of possibility of contact between the working mechanism and an unmanned aircraft is high if an interval between a specified location of the working mechanism and the unmanned aircraft is equal to or less than a predetermined value, and the operation mode of the working mechanism according to the control mode of the operating mechanism brings the specified location closer to the unmanned aircraft.

2. The work machine according to claim 1,
wherein the contact possibility recognition element predicts a future pattern of change in the possibility of contact between the working mechanism and the unmanned aircraft on a basis of a state of change in the relative position of the unmanned aircraft with reference to the working mechanism according to the operation mode of at least one of the lower traveling body, the upper pivoting body, and the working mechanism, and in a case where the contact possibility recognition element predicts that future contact possibility will be high, the contact avoidance operation control element changes the operation mode of at least one of the lower traveling body, the upper pivoting body, and the working mechanism.

3. The work machine according to claim 1, wherein the contact possibility recognition element recognizes a reference space encompassing a space that the working mechanism occupies or passes through in at least one specified period of time on a basis of the operation mode of at least one of the lower traveling body, the upper pivoting body, and the working mechanism in the at least one specified period of time, and recognizes that the contact possibility is high in a case where a real space position of the unmanned aircraft is included in the reference space.

4. A work machine support server having a function for communicating with each of an unmanned aircraft and a work machine, the work machine including a lower traveling body, an upper pivoting body that can pivot with respect to the lower traveling body, a working mechanism that extends from the upper pivoting body, and a control unit that controls an operation mode of each of the lower traveling body, the upper pivoting body, and the working mechanism, the work machine support server comprising:

a contact possibility recognition element which recognizes a degree of possibility of contact between the working mechanism and an unmanned aircraft on a basis of a relative position of the unmanned aircraft with reference to the working mechanism and a control mode of at least one operating levers constituting an operating mechanism selected by an operator of the work machine according to communication with at least one of the work machine and the unmanned aircraft; and a contact avoidance operation control element that transmits a specified signal to the work machine such that, in a case where the contact possibility recognition element recognizes that the contact possibility is high, the operation mode of at least one of the lower traveling body, the upper pivoting body, and the working mechanism is controlled by the control unit so as to reduce the contact possibility, wherein the contact possibility recognition element recognizes that the degree of possibility of contact between the working mechanism and an unmanned aircraft is high if an interval between a specified location of the working mechanism and the unmanned aircraft is equal to or less than a predetermined value, and the operation mode of the working mechanism according to the control mode of the operating mechanism brings the specified location closer to the unmanned aircraft.

* * * * *